(12) United States Patent
Rodriguez et al.

(10) Patent No.: US 9,908,517 B2
(45) Date of Patent: Mar. 6, 2018

(54) PRIMARY PISTON OF A TANDEM MASTER CYLINDER

(71) Applicant: Robert Bosch GmbH, Stuttgart (DE)

(72) Inventors: Marc Rodriguez, Beverly Hills, MI (US); Daniel Grech, Lamorlaye (FR); Laurent Lhuillier, Le Blanc Mesnil (FR)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/901,311

(22) PCT Filed: Jun. 27, 2014

(86) PCT No.: PCT/EP2014/063766
§ 371 (c)(1),
(2) Date: Dec. 28, 2015

(87) PCT Pub. No.: WO2014/207238
PCT Pub. Date: Dec. 31, 2014

(65) Prior Publication Data
US 2016/0137180 A1 May 19, 2016

(30) Foreign Application Priority Data
Jun. 27, 2013 (FR) .................................. 13 56176

(51) Int. Cl.
*B60T 7/04* (2006.01)
*B60T 11/20* (2006.01)
(Continued)

(52) U.S. Cl.
CPC .............. *B60T 11/20* (2013.01); *B60T 7/042* (2013.01); *B60T 11/16* (2013.01); *F15B 15/1447* (2013.01); *F16D 2129/065* (2013.01)

(58) Field of Classification Search
CPC .......... B60T 7/042; B60T 11/20; B60T 11/16; F15B 15/1447; F15B 11/16; F15B 15/2861; F15B 15/2838
See application file for complete search history.

(56) References Cited

U.S. PATENT DOCUMENTS

2005/0268608 A1* 12/2005 Ludsteck .............. F16D 25/088
60/533
2006/0081125 A1* 4/2006 Farrell ................ F04B 27/0878
92/172
2014/0150645 A1* 6/2014 Lhuillier ............... B60T 11/232
92/248

FOREIGN PATENT DOCUMENTS

CN 102656069 A 9/2012
FR 2 855 108 11/2004
(Continued)

OTHER PUBLICATIONS

International Search Report for PCT/EP2014/063866, dated Mar. 27, 2014.

*Primary Examiner* — Nathaniel Wiehe
*Assistant Examiner* — Abiy Teka
(74) *Attorney, Agent, or Firm* — Norton Rose Fulbright US LLP; Gerard Messina

(57) ABSTRACT

A primary piston of a tandem master cylinder includes: a body provided with a skirt, having in the rear thereof a cavity for the plunger and the push rod connected to the brake pedal and in the front a cavity defining the primary chamber. The piston is made of a plastic material and at least one magnet is built into the body of the piston.

14 Claims, 1 Drawing Sheet

(51) Int. Cl.
 *B60T 11/16* (2006.01)
 *F15B 15/14* (2006.01)
 F16D 129/06 (2012.01)

(56) References Cited

FOREIGN PATENT DOCUMENTS

| | | | | |
|---|---|---|---|---|
| FR | 2885108 | A1 | 11/2006 | |
| FR | 2 969 085 | | 6/2012 | |
| FR | 2 969 087 | | 6/2012 | |
| FR | 2 969 090 | | 6/2012 | |
| FR | 2969085 | A1 * | 6/2012 | ............ B60T 11/232 |
| WO | WO 9211510 | A1 * | 7/1992 | .......... F15B 15/2807 |

* cited by examiner

PRIMARY PISTON OF A TANDEM MASTER CYLINDER

BACKGROUND OF THE INVENTION

1. Field of the Invention

The present invention concerns a primary piston of a tandem master cylinder comprising a body equipped with a skirt having, in the rear, a cavity for the plunger and push rod connected to the brake pedal and, in the front, a cavity delimiting the primary chamber.

2. Description of the Related Art

Such a master cylinder primary piston is known in general. It is realized of a light metal alloy or aluminum. The transmission line ahead of the primary piston is equipped with movement detection means to trigger the servobrake or actuating mechanism of the plunger and push rod acting upon the primary piston, which itself acts upon the secondary piston to develop pressure in the primary and secondary chambers.

BRIEF SUMMARY OF THE INVENTION

The object of the present invention is the simplification of the manufacture of primary pistons of tandem master cylinders in order to reduce the cost without modifying the structure of the body of the tandem master cylinder. Another object of the invention is the development of means for simplifying detection of the braking request exerted upon the brake pedal and transmitted by the kinematic chain connecting the pedal to the primary piston.

To that end, the object of the invention is a primary piston of a tandem master cylinder of the type described above, characterized in that the piston is made of plastic and at least one magnet is incorporated into the body of the piston. The primary piston according to the invention has the benefit of being very easy to produce because it is made of molded or injected plastic material and, additionally, incorporates a position detection means that is connected to the kinematic chain associating the primary piston with the brake pedal or an equivalent means of brake control.

According to another beneficial characteristic, the magnet is incorporated into the body of the piston with a disk shape, overmolded so that this metallic insert reinforces the rigidity of the piston body and constitutes a skeleton for the plastic material overmolding the magnet. This arrangement is of particular interest because the piston body is at the junction of a portion of the thrust rod on the forward side and the return spring of the primary piston on the rearward side, with, additionally, pressure being generated in the primary chamber, which is redistributed to the piston body.

According to another particularly beneficial characteristic, the skirt is continued in front by an interior peripheral housing in which is integrated a magnetic crown. This peripheral housing not only reinforces the front extremity of the piston but has the added benefit of being able to house a means for detecting the movement of the primary piston without increasing its size or complicating its manufacture. This magnetic crown is integrated into the molding of the piston or after molding by using a force fit.

According to another advantageous characteristic, the plastic material is filled with ferrite fibers in the volume surrounding the integrated element.

According to another advantageous characteristic, the plastic material is filled with glass fibers.

According to the invention, the piston is preferably made of a plastic material that is a phenolic resin.

According to the invention, the fiberglass and ferrite fiber fill of the plastic material is preferably comprised between 70% and 80%.

DETAILED DESCRIPTION OF THE INVENTION

Figure 1:
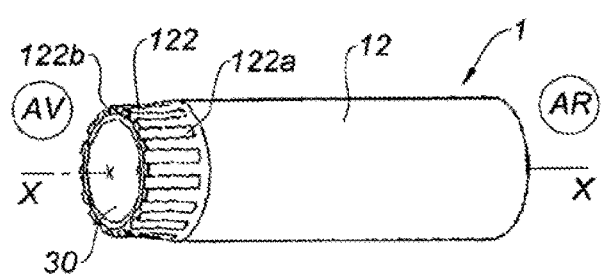
FIG. 1 is an isometric view of a primary piston according to the invention.
Figure 3:
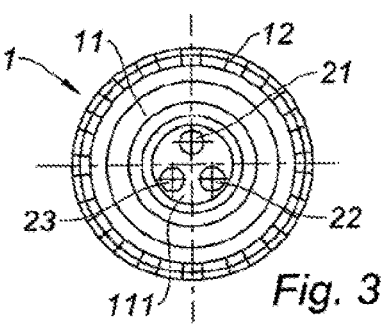
FIG. 3 is a transverse section of the piston of FIG. 1 near the forward portion of the piston.

As shown in FIG. 1, primary piston 1 according to the invention has, in its orientation along axis xx, a front portion (AV) and a rear portion (AR), corresponding to the conventional orientation of a master cylinder and the primary piston it houses. The master cylinder is not shown.

Figure 2:
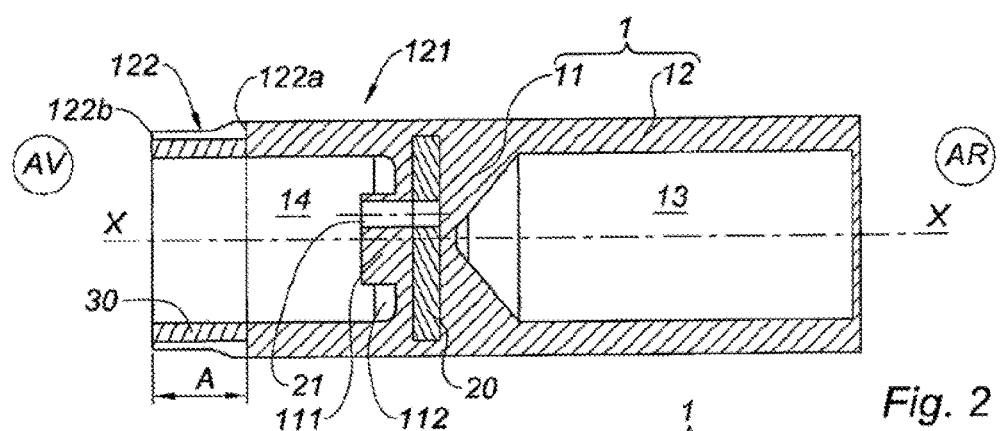
FIG. 2 is an axial cutaway of the primary piston according to the invention.
Figure 4:
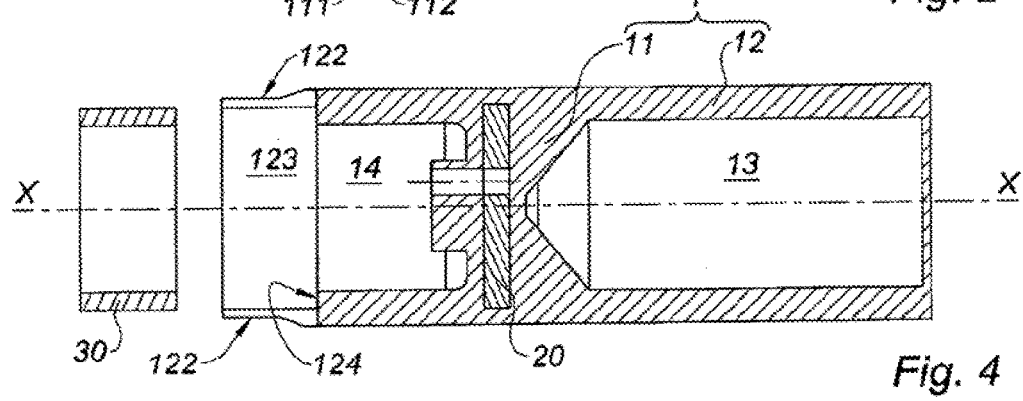
FIG. 4 is an axial section of the primary piston in which the magnetic ring has been separated.

According to FIG. 2, piston 1, made of plastic material, consists of body 11 bearing skirt 12 in a single piece. Piston 1 delimits rear cavity 13 accommodating the plunger and the pushrod connected to the brake pedal. In front, primary piston 1 has cavity 14 accommodating the return spring and the spring guide so as to make contact with the secondary piston, located to the left. The rear of cavity 14, formed by body 11, has a central portion in relief 111 delimiting peripheral groove 112 with which the return spring makes contact, central portion 111 providing positioning for the end of the return spring guide. Said forward cavity 14 partially delimits the primary chamber of the master cylinder. The different elements described above, which equip or surround the primary piston, are known means not represented or described in greater detail.

Body 11 has magnet 20 in the shape of a disk integrated into the body by overmolding. Said magnet 20 is positioned in the injection mold on a support that immobilizes the magnet and holds it in place in the mold cavity. As shown in FIGS. 1 and 2, magnet 20 is carried by three pins distributed in a triangle. These pins leave cavities 15 in the finished product.

Front 121 of skirt 12 is externally equipped with a series of grooves 122 terminating near front 122b and forming a kind of crenelated ring along an axial length (A) such that rear extremity 122a of grooves 122 is found beyond the pressure cup associated with the primary piston in the tandem master cylinder in such a way that at rest, said extremity 122a of the grooves emerges in the supply groove of the primary chamber, which groove is itself connected to the hydraulic liquid reservoir. When the primary piston is pushed to generate pressure in the primary chamber, said terminating extremity 122a of grooves 122 passes beyond the pressure cup so that communication with the hydraulic liquid distribution groove is cut and pressure can begin to rise in the primary chamber. Forward extremity 122b of grooves 122 is open and emergent. Interiorly, extremity 121 has annular housing 123 with shoulder 124 in which is fixed magnetic crown 30.

The piston is advantageously made of a phenolic resin that is a thermohardening resin having the advantage of being reasonably priced and having a coefficient of thermal expansion in the neighborhood of aluminum, which is the material generally used for the body of the master cylinder.

According to the invention, the piston is filled with glass fibers that reinforce the phenolic resin. In an especially interesting manner, the phenolic resin is filled with glass fibers and ferrite, and the total concentration of fibers in the phenolic resin of the piston is preferably comprised between 70 and 80% by weight.

The invention claimed is:

1. A primary piston for a tandem master cylinder, comprising:
   a body equipped with a skirt, the body having in the rear, a cavity for a plunger and a pushrod connected to a brake pedal, and in the front, a cavity delimiting a primary chamber, the skirt including in the front a series of grooves extending back from a forward extremity of the skirt and an annular interior peripheral housing located between the grooves and a central axis of the primary piston; and
   an annular magnetic crown incorporated into the annular interior peripheral housing,
   wherein the piston is made of plastic, and at least one magnet is incorporated into the body of the piston.

2. The primary piston according to claim 1, wherein the magnet incorporated in the body of the piston is shaped like an overmolded disk.

3. The primary piston according to claim 1, wherein the plastic material is filled with ferrite fibers in the volume surrounding the incorporated magnet.

4. The primary piston according to claim 1, wherein the piston is made of a phenolic resin.

5. The primary piston according to claim 1, wherein the plastic material is filled with fibers in a weight ratio of 70-80%.

6. The primary piston according to claim 1, wherein the interior peripheral housing is delimited by an annular wall of a forward extremity of the primary piston.

7. The primary piston according to claim 1, wherein the interior peripheral housing is further delimited by a shoulder of the primary piston, the shoulder including a transverse wall extending perpendicularly to a longitudinal axis of the primary piston.

8. The primary piston according to claim 1, wherein the annular magnetic crown is attached to the interior peripheral housing by a force fit.

9. The primary piston according to claim 1, wherein the interior peripheral housing has a cylindrical interior wall contacting a cylindrical wall of the annular magnetic crown.

10. The primary piston according to claim 1, wherein the interior peripheral housing has a transverse interior wall contacting a transverse end face of the annular magnetic crown.

11. The primary piston according to claim 1, wherein the annular magnetic crown includes a transverse end face extending perpendicularly to a longitudinal axis of the primary piston.

12. The primary piston according to claim 11, wherein the transverse end face of the annular magnetic crown aligns with a transverse end face of a forward extremity of the skirt.

13. The primary piston according to claim 1, wherein the interior peripheral housing and the annular magnetic crown are ringed by a series of grooves on an exterior surface of the forward extremity of the skirt.

14. The primary piston according to claim 1, wherein an interior cylindrical surface of the annular magnetic crown aligns with an interior cylindrical surface of the skirt.

* * * * *